April 8, 1947.  A. BAUMANN  2,418,569
BEATING WING AIRCRAFT
Filed Oct. 13, 1943  3 Sheets-Sheet 1
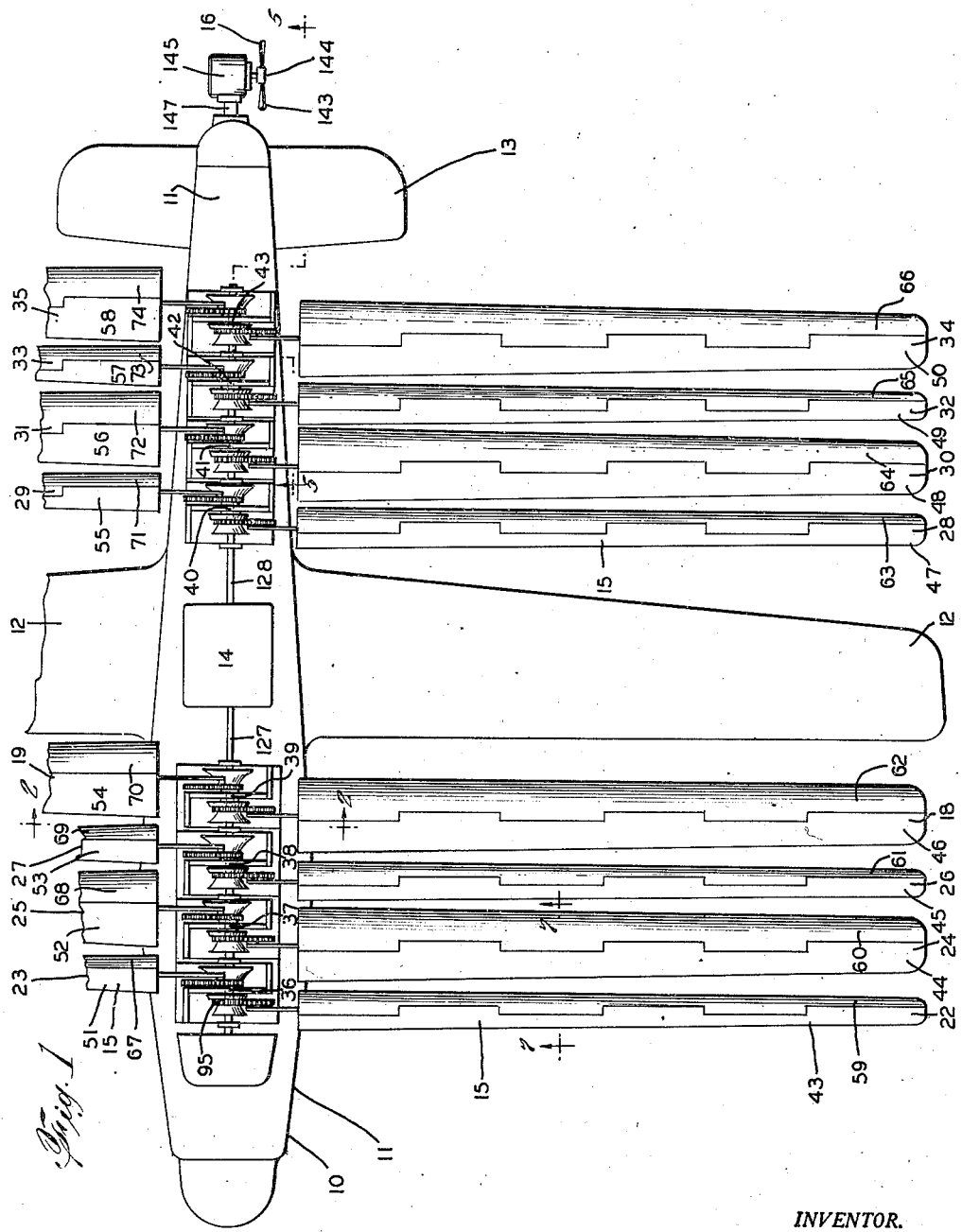
INVENTOR.
AUGUST BAUMANN
BY *Fritz Ziegler*
ATTORNEY

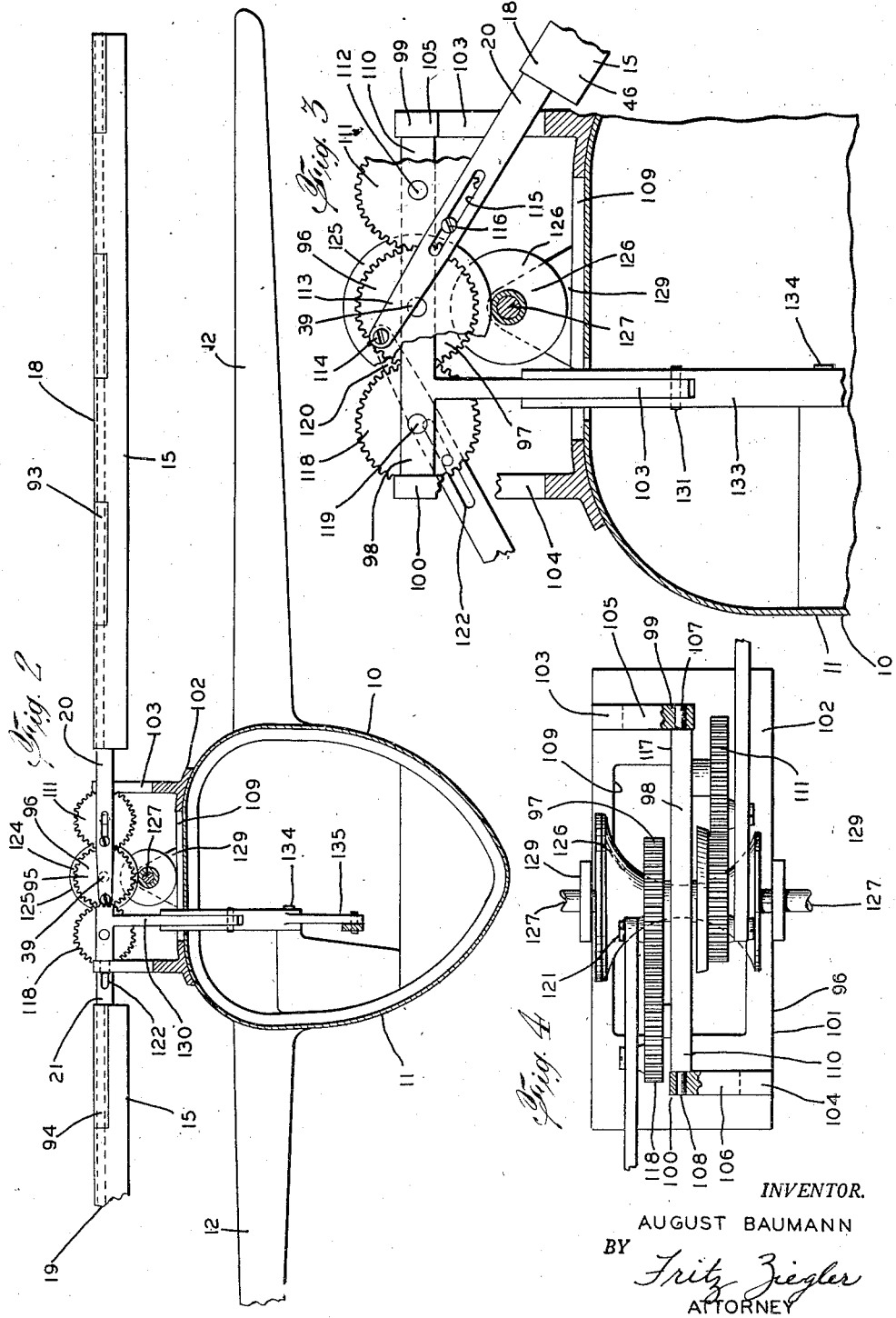

April 8, 1947.　　　A. BAUMANN　　　2,418,569
BEATING WING AIRCRAFT
Filed Oct. 13, 1943　　　3 Sheets-Sheet 3
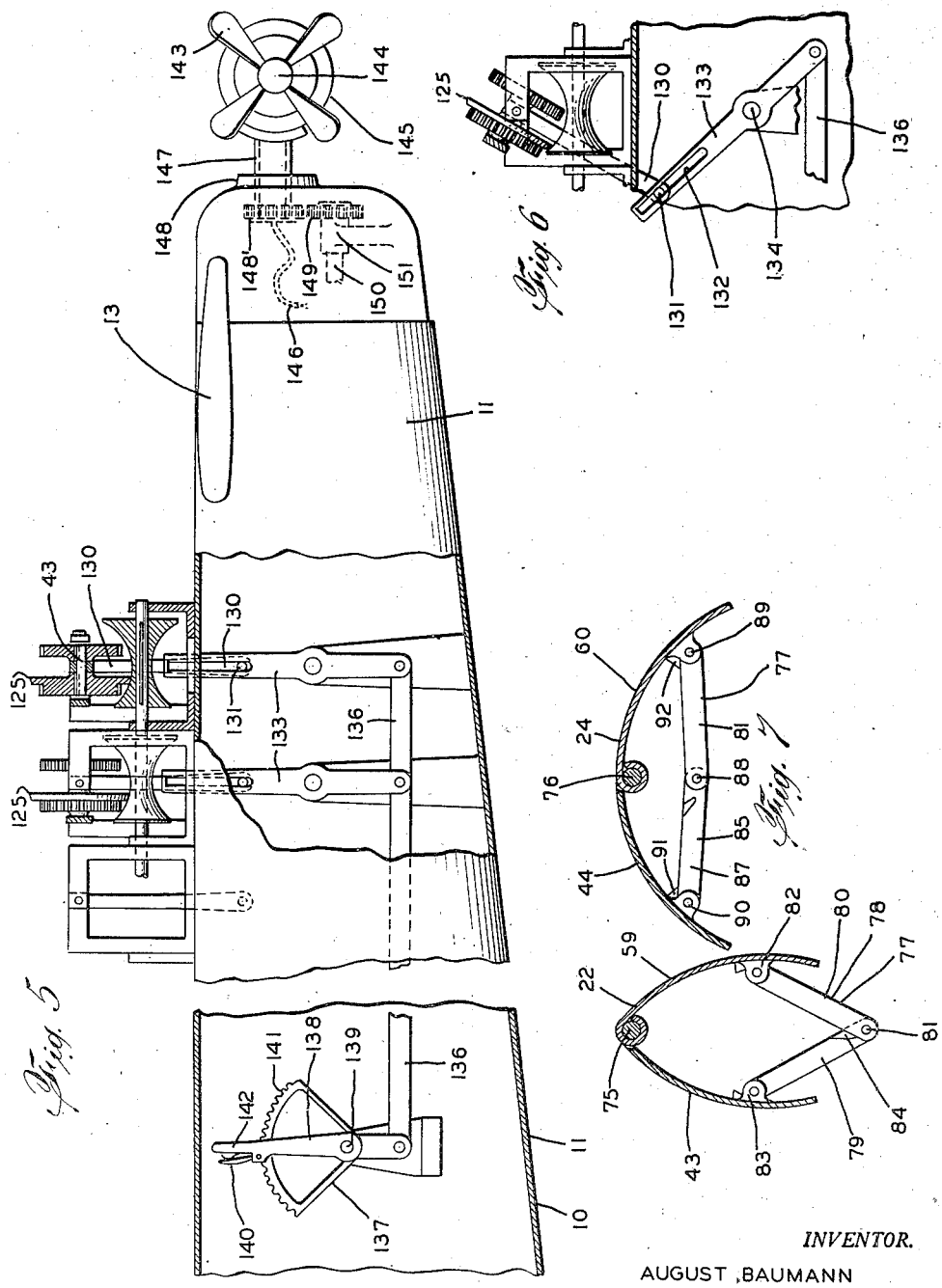
INVENTOR.
AUGUST BAUMANN
BY
Fritz Ziegler
ATTORNEY Patented Apr. 8, 1947

2,418,569

UNITED STATES PATENT OFFICE 2,418,569

BEATING WING AIRCRAFT

August Baumann, Brooklyn, N. Y.

Application October 13, 1943, Serial No. 506,022

7 Claims. (Cl. 244—22)

This invention relates generally to aircraft and more particularly to those of the type which are adapted to support themselves in the air with varying amounts of movement with relation to the earth therebelow.

Among the principal objects of the present invention lies the provision of aircraft adapted to rise from the ground in a vertical direction or in any desired direction.

Another object herein lies in the provision of structure of the class described wherein the aircraft, once aloft, may move in various directions, the aircraft meanwhile being maintained suspended in the air independently of relatively horizontal movement of the aircraft.

Another object herein lies in the provision of aircraft wherein vertically and arcuately reciprocating wings serve to elevate the aircraft and also serve to cause the aircraft to ascend in desired directions.

Another object herein lies in the provision of aircraft elevating structure wherein vertically and arcuately oscillatable wings may be driven by a single power source located externally with relation to the cabin portion of the craft.

Another object herein lies in the provision of aircraft elevating structure including plurality of pairs of oscillatable wings arranged so that wings in their active position alternate with wings in a relatively inactive position.

Another object herein lies in the provision of aircraft of the class described which are readily controlled and which possess the quality of easy maneuverability to a high degree.

Another object herein lies in the provision of novel tail structure adapted to quickly and easily aim, maneuver and direct the travel of the aircraft.

These objects and other incidental ends and advantages will more fully appear in the progress of this disclosure and be pointed out in the appended claims.

In the drawings, in which similar reference characters designate corresponding parts throughout the several views:

Figure 1 is a fragmentary plan view, showing a preferred embodiment of the invention.

Figure 2 is an enlarged fragmentary vertical sectional view as seen from the plane 2—2 on Figure 1.

Figure 3 is an enlarged fragmentary sectional view, showing in detail certain of the mechanisms shown in the upper part of Figure 2, in an altered position thereof.

Figure 4 is a fragmentary enlarged plan view of one of the driving mechanisms shown on Figure 1.

Figure 5 is a fragmentary elevational view of the right hand portion of Figure 1, as seen from the plane 5—5 thereon.

Figure 6 is a fragmentary elevational view, showing a detail of the wing tilting mechanism.

Figure 7 is an enlarged fragmentary vertical sectional view as seen from the plane 7—7 on Figure 1.

In accordance with my invention, the aircraft generally indicated by numeral 10 may in a number of respects conform to present accepted aeronautical construction practice and may include a fuselage 11, main wings 12, a tail 13, and any suitable source of motive power as, for example, a gasoline or Diesel engine 14.

The main wings 12 and the tail 13 perform their usual functions in flight so that when the aircraft 10 is moving forwardly or to the left as viewed in Figure 1, the main wings 12 have a positive lift.

In accordance with my improvement, forwardly and rearwardly of the main wings 12 I provide a plurality of pairs of driving wings generally indicated by numeral 15 which are so constructed that they can raise the plane or impart to it forward or rearward motion. The steering of the plane, that is to say, the movement or rotation thereof about a vertical axis is accomplished by means of the tail propeller 16. Thus by virtue of the tilting mechanism generally indicated by numeral 17 the direction of motion of the driving wings 15 may be changed with relation to a horizontal axis so that the aircraft may be elevated, driven forward, or driven rearward.

Since all of the pairs of driving wings are substantially uniform, a description of one will suffice for all. The driving wings shown in Figure 2 include a left driving wing 18 and a right driving wing 19.

All the driving wings 18 and 19 include a driving wing support member 20 and 21 respectively.

Thus as seen in Figure 1, in addition to the driving wings 18 and 19, there are additional driving wings 23 to 35 inclusive. The driving wings are arranged in eight pairs so that four pairs are in an active position when the remaining four pairs are in an inactive position. This balance between the active and inactive driving wings provides a substantially uniform lift therefrom. Obviously, where desired, the total number of driving wings may be varied from that shown, but it is desirable that there be an equal number of driving wings disposed on the opposite sides of the longitudinal axis of the fuselage 11. It is also desirable that there be an even number of pairs of driving wings so that alternate elevating cycles, or portions of a complete cycle of rotation of the main connecting shafts 36 to 42 inclusive, will produce substantially identical lift.

Each of the driving wings 15 includes a fore vane 43 to 58 and an aft vane 59 to 74, both inclusive. The fore and aft vanes are hingedly interconnected along their abutting edges and this structure is best seen in Figure 7 in which the fore vane 43 is hingedly connected to the aft vane 59 by the hinge pin 75; while the fore vane 44 is hingedly connected to the aft vane 60 by the hinge pin 76. Although I have shown this hinge structure as being formed by knuckles integrally extending from the vanes themselves, it will be obvious to those skilled in the art to which the present invention relates that equivalent independent hinges may be used.

Ease of movement of the fore and aft vanes with relation to each other is desirable because the driving wings are opened and closed by the action of the air and by gravity. Thus the driving wing 22 as viewed in Figure 7 is traveling in an upward direction and is in a so called inactive condition, wherein the air pressure on the upper or outer surfaces of the vanes 43 and 59 causes them to rotate toward each other about the pin 75. The driving wing 24 as viewed in Figure 7 is travelling in a downward direction and is in a so called active condition wherein air pressure on the lower or inner surfaces of the vanes 44 and 60 causes them to rotate away from each other about the pin 76. The movement of the vanes 43 and 59 as viewed in Figure 7 is aided by the action of gravity.

Inter-vane movement on any given driving wing is affected by vane movement controls generally indicated by reference character 77. Any desired number of these controls may be associated with an individual driving wing. In Figure 7 the driving wing 22 has the inter-vane movement control 78 which includes a pair of links 79 and 80 which are pivotally interconnected by the pin 81. The outer ends of the links 80 and 79 are pivotally connected to the nearest vanes 59 and 43 by means of the knuckles and pins 82 and 83. Suitable detent means 84 may be provided to limit the movement of the vanes 43 and 59 toward each other. In Figure 7 the driving wing 24 has the inter-vane movement control 85 which includes a pair of links 86 and 87 which are pivotally interconnected by the pin 88. The outer ends of the links 86 and 87 are pivotally connected to the nearest vanes 60 and 44 by means of the knuckles and pins 89 and 90. Suitable detent means 91 and 92 may be provided to limit the movement of the vanes outwardly of each other. Thus the inter-vane movements controls 77 serve to regulate the effective width of the driving wings (longitudinally of the aircraft 10) so that the driving wings move in spaced and parallel generally vertical planes without interfering with each other's movement. The controls also act to cause the driving wings to take a predetermined configuration on the up and down strokes thereof. In Figure 1 of the accompanying drawings, the driving wings 22, 23, 26, 27, 28, 29, 32, and 33 are in the course of their upstroke, or inactive portion of their cycle. The driving wings 24, 25, 18, 19, 30, 31, 34, and 35 are in the course of their downstroke or active portion of their cycle of movement.

Returning now to a particular consideration of Figure 2 where are shown the driving wings 18 and 19, which all the other pairs of driving wings resemble, we find that the driving wing support member 20 connects with a pin 93 while the driving wing support member 21 connects with a pin 94. The pins 93 and 94 are similar to the pins 75 and 76 previously described. Thus movements of the support members 20 and 21 is transmitted to the driving wings 18 and 19 by the pins 93 and 94.

The driving wings 18 and 19 and hence the other pairs corresponding thereto are causes to reciprocate by virtue of the driving wing reciprocating mechanisms generally indicated by reference character 95. As seen on Figure 1, in the embodiment shown, there are eight of these driving wing reciprocating mechanisms. In the one shown in Figures 2, 3, and 4, there are a pair of central gears 96 and 97, which are substantially identical with each other, and these gears are keyed to the main connecting shaft 39, so as to rotate in unison with each other and said shaft. The shaft 39 is journalled in the movable frame 98 which is in turn trunnioned in the bearings 99 and 100 on the stationary frame 101. The stationary frame 101 includes a base 102 having a pair of vertical uprights 103 and 104 with laterally extending (longitudinally of the aircraft) bearing supports 105 and 106. The bearing supports 105 and 106 carry at the ends thereof the bearings 99 and 100. Since the movable frame 98 is trunnioned as described, it, together with all of the structure which it carries is rotatable about an axis passing through the bosses 107 and 108. The base 102 is provided with a central orifice 109.

On the forward surface 110 of the movable frame 98 a left fulcrum gear 111 is rotatably mounted on a short axle 112. The gear 111 is substantially identical with the gear 96 and meshes constantly therewith. The inner end 113 of the driving wing support member 20 is pivotally connected by the pivot 114 to the forward surface of the gear 96. Between the inner end 113 and the inner end of the driving wing 18, the support 20 is provided with a slot 115 which is penetrated by a headed pivot or fulcrum 116. Since the gears 96 and 111 rotate in opposite directions, the pivot 114 goes up when the fulcrum 116 goes down, and vice versa. The effect of this construction is to increase the length of travel of the driving wing.

On the rear surface 117 of the movable frame 98 a right fulcrum gear 118 is rotatably mounted on a short axle 119. The gear 118 is substantially identical with the gear 97 and meshes constantly therewith. The inner end 120 of the driving wing support member 21 is pivotally connected by the pivot 121 to the rear surface of the gear 97. Between the inner end 120 and the inner end of the driving wing 19, the support 21 is provided with a slot 122 which is penetrated by a headed pivot or fulcrum 123. Since the gears 97 and 118 rotate in opposite directions, the pivot 121 goes up when the fulcrum 123 goes down, and vice versa. The effect of this construction is to lengthen the travel of the driving wing 19.

The gears 96 and 97 are keyed together and hence rotate in the same direction; this causes the wings 18 and 19 to vertically reciprocate in unison.

Keyed to the shaft 39 is a disc 124. The disc 124 is concentrically mounted upon said shaft and has the periphery thereof so as to have a high coefficient of friction. The periphery 125 may thus be composed of treated leather or of a rubber composition, or of a compound of asphalt and asbestos. Other suitable materials for this purpose are well known in the brake lining and clutch facing arts.

The periphery 125 engages frictionally and under sufficient pressure to avoid undesired slippage, the double cone 126. The cone is of such shape that the uppermost surface or portion of the surface thereof is radially equidistant from the axis of rotation of the movable frame 98. Thus regardless of the degree of rotation of the movable frame 98 (within certain limits), the periphery 125 of the disc 124 will engage the cone 126. The cone 126 is concentric with a forward drive shaft 127 connected to the forward portion of the engine or motor 14. The corresponding cones associated with the four rear pairs of driving wings are attached to the rear drive shaft 128. The shafts 127 and 128 are suitably supported in bearings generally indicated by reference character 129.

The tilting of the driving wings 15 is accomplished by shifting the tilt bar 130 extending downwardly from the movable frame 98. The bar 130 is provided with a fixed pin 131 which rides in slots 132 in a bifurcated lever 133 pivotally mounted at 134. The lower end 135 of the lever 133 is linked to the lower end of all of the other levers corresponding thereto (see Figure 5), and is thus articulately connected by the tie rod 136 to the control 137.

The control 137 includes an operating lever 138 pivotally mounted at 139. The lever 138 may be maintained in any adjusted position thereof by a hand released spring engaged ratchet 140 which engages with the rack 141. When the handle 142 is pushed forwardly, or to the left as viewed in Figure 5 all of the driving wings 15 will be tilted forwardly to provide a lift in the plane of their motion and generally upwardly and forwardly. Moving the handle 142 in the opposite direction will cause the driving wings 15 to be tilted rearwardly to provide a lift to the aircraft in the plane of their motion and generally upwardly and rearwardly.

While I have illustrated in the drawings, a manually operated control 137, obviously the same may be power operated where desired, using any suitable power such as hydraulic or electric power.

The tail 13 may be of well known construction with the exception that the rudder is eliminated and propeller 16 is substituted therefor. The propeller 16 has a plurality of variable pitch blades 143 mounted on a hub 144 in turn mounted on the driving shaft of the motor 145. The motor may be an electric one driven by a generator (not shown) driven by the engine or motor 14. Power may be transmitted to the motor 145 through the flexible cable 146. The motor 145 is mounted on hollow standard 147 which is rotatable about an axis substantially the longitudinal axis of the fuselage 11.

The standard 147 is rotatably mounted in the back of the fuselage 11 in the bearing 148. The standard 147 may thus be rotated about a horizontal longitudinal axis by means of the gears 148 and 149. The gear 149 is located and fixed to the rear end of a shaft 150 which is journalled in the bearing 151. The forward end of the shaft 150 (not shown) may be associated with any suitable apparatus for controlling the rotation thereof.

With the propeller 16 in the position shown in Figures 1 and 5 the tail of the fuselage may be moved to the right or left depending upon the direction of rotation of the hub 144 of the motor 145 and the pitch of the blades 143. Thus either the motor can be reversed or the blade pitch reversed to get port or starboard movement of the fuselage. Where desired the blades could be adjusted to have no effective pitch.

By rotating the standard 147 through 90° the propeller 16 may cause the tail to go up or down for climbing or diving.

By virtue of the previously described structure, an aircraft is disclosed which is capable of flight in various directions and admits of various combinations of driving forces.

From a standing position on the airport runway, the plane may be caused to rise vertically by the action of the driving wings 15. After the aircraft 10 has sufficient altitude, the driving wings may be tilted in a forward direction which will cause the aircraft to travel in the same direction. Depending upon the particular flight characteristics of the main wings 12, at a certain forward air speed, the wings 12 will contribute their lift in a well known manner. Returning the control handle 142 to a vertical position will cause the driving wings first to return to their normal position, and to provide principally vertical lift. This last mentioned position of the driving wings 15 permits them to cause the aircraft 10 to hover, drop, or elevate, depending upon the speed of reciprocation of the wings 15. This speed may be controlled in the usual manner by means of a well known throttle (not shown) associated with the engine or motor 14.

The control permitted by the propeller 16 may be added to the other controls just described so that the aircraft may be caused to rotate about a vertical axis while hovering, ascending or descending. In relatively level straightline flight, the propeller 16 may be used to change flight direction or to cause the aircraft to dive or rise and climb at an angle to the horizon.

In accordance with the present invention the driving wings 15 may be located above the fuselage, as best seen in Figures 2 and 5. This permits the engine 14 to be similarly located, so that the roof of the finished fuselage may be constructed in such a manner as to form a fire wall. This construction also permits to the driving wings 15 to be of sufficient length and have a sufficient downward sweep on the downsweep portion of their reciprocation cycle, and yet not require excessive height in the landing gear.

As previously mentioned, the alternate pairs of the driving wings 15 are so arranged that they supply a substantially continuous lift. This is so because as soon as the particular pairs of wings reach their lowermost position and start to rise, the alternate pairs start to go down and thus begin their lifting action. Synchronism of motion must be maintained where the alternate pairs of driving wings are spaced close to each other as shown in Figure 7. This is accomplished by having a sufficiently tight engagement between the several discs corresponding to the disc 125 and the several cones corresponding to the cones 126, so that no slippage can occur.

I wish it to be understood that I do not desire to be limited to the exact details of construction shown and described, for obvious modifications will occur to a person skilled in the art.

I claim:
1. An aircraft comprising: a first driving wing which is reciprocatable having an active phase and an inactive phase; a second driving wing which is reciprocatable having an active phase and an inactive phase; said first and second wings in their active phase being wider than in their active phase; said wings being correlated so that only one of said wings is in the active phase at any point in time; said wings being located next to each other on centers which are separated from each other a distance less than the width of a wing in the active phase thereof, whereby the wings may pass each other without engaging, and whereby the area occupied by the wing in active phase is greater than one-half the total area which may be occupied by both wings, producing greater lift for a given area of total wing occupation.

2. In an aircraft: a fuselage; a pair of driving wings mounted on said fuselage, said wings extending laterally on opposite sides of said fuselage; means movably mounting said wing on said aircraft; means to oscillate said wings in unison and in a common plane to provide propulsion for said aircraft; and means to tilt said last mentioned means, whereby said common plane is rotated about a horizontal axis transversely disposed with respect to said aircraft; said tilting means including a movable frame shiftable about said horizontal axis; first and second gears rotatable in unison about a common second axis and mounted on said movable frame; said wings being connected to said gears; a disc connected to said first and second gears; and a double cone, said disc frictionally engaging said double cone.

3. In an aircraft: a fuselage; a pair of driving wings mounted on said fuselage, said wings extending laterally on opposite sides of said fuselage; means movably mounting said wings on said aircraft; means to oscillate said wings in unison and in a common plane to provide propulsion for said aircraft; and means to tilt said last mentioned means, whereby said common plane is rotated about a horizontal axis transversely disposed with respect to said aircraft; said tilting means including a movable frame shiftable about said horizontal axis; first and second gears rotatable in unison about a common second axis and mounted on said movable frame; said wings being connected to said gears; a disc connected to said first and second gears; a double cone; said disc frictionally engaging said double cone; and means to shift the movable frame.

4. For use in an aircraft, a propulsion device comprising: a pair of wings; means to oscillate said wings in a predetermined plane; and means to tilt said last mentioned means; said tilting means including a movable frame; first and second gears rotatably mounted on the movable frame and adapted for rotation in unison; said wings being connected to said gears; a disc connected to said first and second gears; and a double cone, said disc frictionally engaging said double cone; whereby motion of the double cone is transmitted through the disc and the gears to the wings in a plurality of positions of the movable frame.

5. For use in an aircraft a propulsion device comprising: a pair of wings; means to oscillate said wings in a predetermined plane; and means to tilt said last mentioned means; said tilting means including a movable frame; first and second gears rotatably mounted on the movable frame and adapted for rotation in unison; said wings being connected to said gears; a disc connected to said first and second gears; and a double cone, said disc frictionally engaging said double cone; whereby motion of the double cone is transmitted through the disc and the gear to the wings in a plurality of positions of the movable frame; and means to shift the movable frame.

6. An aircraft comprising: a fuselage; first and second driving wings movably mounted on said fuselage; and means to vertically oscillate said wings, said means including first and second coaxially mounted gears rotatable in unison with each other and to which the inner ends of said first and second wings, respectively, are pivotally connected; a third gear in mesh with the first mentioned gear and slidably connected to one of the wings; and a fourth gear in mesh with the second mentioned gear and slidably connected to the other wing.

7. For use in an aircraft utilizing vertically oscillatable first and second wings, wing driving and tilting mechanism comprising: first and second gears coaxially mounted for rotation in unison upon a movable frame element, said first and second gears being keyed to rotate in the same direction; said first and second wings at the inner ends thereof being connected to said first and second gears respectively; third and fourth gears rotatably mounted on said frame element and meshing with said first and second gears respectively; the first and second wings being slidably connected to said third and fourth gears respectively; a disc connected to said first and second gears; a double cone rotatable about an axis which is stationary with respect to said movable frame element; said disc frictionally engaging said double cone whereby the rotation of the double cone causes the wings to reciprocate and whereby the movable frame may be shifted to a plurality of positions, the disc continuing to contact said double cone in said positions so that reciprocation of the wings is continued.

AUGUST BAUMANN.

REFERENCES CITED

The following references are of record in the file of this patent:

UNITED STATES PATENTS

| Number | Name | Date |
|---|---|---|
| 2,318,260 | Sikorsky | May 4, 1943 |
| 929,362 | Zalondek | July 27, 1909 |
| 224,510 | Blackman | Feb. 17, 1880 |
| 1,355,111 | Simons | Oct. 5, 1920 |

FOREIGN PATENTS

| Number | Country | Date |
|---|---|---|
| 387,694 | French | May 13, 1908 |
| 535,821 | French | Jan. 31, 1922 |
| 235,252 | German | July 1, 1911 |